(12) United States Patent
Dixon (10) Patent No.: US 10,987,577 B2
(45) Date of Patent: Apr. 27, 2021

(54) HAND-HELD GAME CONTROLLER WITH COOLING FEATURES

(71) Applicant: Paul M. Dixon, Akron, OH (US)

(72) Inventor: Paul M. Dixon, Akron, OH (US)

( * ) Notice: Subject to any disclaimer, the term of this patent is extended or adjusted under 35 U.S.C. 154(b) by 75 days.

(21) Appl. No.: 16/535,217

(22) Filed: Aug. 8, 2019

(65) Prior Publication Data

US 2021/0038977 A1  Feb. 11, 2021

(51) Int. Cl.
*A63F 9/24*   (2006.01)
*A63F 13/24*  (2014.01)
*A63F 13/92*  (2014.01)

(52) U.S. Cl.
CPC .............. *A63F 13/24* (2014.09); *A63F 13/92* (2014.09); *A63F 2300/1043* (2013.01)

(58) Field of Classification Search
CPC .......... A63F 13/02; A63F 13/24; A63F 13/98; A63F 2300/1043
See application file for complete search history.

(56) References Cited

U.S. PATENT DOCUMENTS

| | | | |
|---|---|---|---|
| 6,135,876 A | 10/2000 | Song et al. | 454/184 |
| 6,241,247 B1* | 6/2001 | Sternberg | H01H 9/0242 273/148 B |
| 6,909,602 B2 | 6/2005 | Dietrich et al. | 361/687 |
| D620,938 S | 8/2010 | Suetake et al. | D14/401 |
| 2005/0269769 A1* | 12/2005 | Naghi | A63F 13/06 273/148 B |
| 2006/0178211 A1* | 8/2006 | Chien | A63F 13/98 463/37 |
| 2006/0279039 A1* | 12/2006 | Krieger | A63F 13/54 273/148 B |
| 2007/0093292 A1 | 4/2007 | Naghi et al. | 463/36 |
| 2009/0156307 A1 | 6/2009 | Aguirre et al. | 463/38 |
| 2012/0258800 A1* | 10/2012 | Mikhailov | A63F 13/24 463/37 |
| 2013/0095925 A1* | 4/2013 | Xu | G06F 1/169 463/37 |
| 2017/0181467 A1* | 6/2017 | Cameron | A24F 47/008 |

FOREIGN PATENT DOCUMENTS

GB   2 390 130 A   12/2003   .............. G06K 11/18

* cited by examiner

*Primary Examiner* — Lawrence S Galka
(74) *Attorney, Agent, or Firm* — Renner Kenner Greive Bobak Taylor & Weber (57) ABSTRACT

A hand-held game controller with cooling features includes a housing with at least one hand grip extending therefrom which forms a hand grip cavity. The housing or the at least one hand grip has a plurality of openings therethrough. A motor has a rotatable shaft that is carried in the housing and the at least one hand grip and extends into the hand grip cavity. A fan is connected to the rotatable shaft which, when rotated by the rotatable shaft, generates air flow into and out of the plurality of openings.

17 Claims, 6 Drawing Sheets

HAND-HELD GAME CONTROLLER WITH COOLING FEATURES

TECHNICAL FIELD

The present invention is directed to a hand-held video game controller. Specifically, the present invention is directed to a hand-held video game controller with cooling provided in the controller's handles.

BACKGROUND ART

While playing video games with hand-held controllers, players often find that their hands become sweaty and hot. Regardless if single- or multi-player, video games are by their nature competitions and a competitive environment causes players to become tense and nervous as they play. Video games with hand-held controllers also require significant physical dexterity from the hand muscles, as the players have to make repeated quick movements with the thumbs and fingers while holding onto the controller. The physical exertion of playing combined with the muscle tension and mental anxiety of competition causes a player's hands to sweat.

Sweaty hands are uncomfortable and distracting, and are detrimental to video game play because they cause players to make mistakes when they lose grip of the controller. Conventional video game controllers generally do not provide features for minimizing or removing the heat produced by the player's hands or the controller itself. Consequently, players must either play through the game with sweaty hands or let go of the controller during the game in order to wipe their hands dry. Either way, sweaty hands interfere with a player's optimal performance and detract from the enjoyment of the video game.

It is known in the art to address this problem by incorporating a fan in the main body of the controller. It is also known to utilize other thermo-electric devices, also known as Peltier devices, to dissipate heat generated from the controller. However, these solutions are overly complex and may require direct contact with the player's hands and, as such, are unlikely to work in practice. Other proposed solutions utilize a liquid pump which internally routes cooling liquid in the area of the handles, but again, such a configuration adds a significant cost and risks the possibility of liquid leaking into the electronics of the controller, thereby rendering it inoperative.

Therefore, there is a need in the art to incorporate a simpler cooling feature into a hand-held game controller which is likely to be used and which is relatively inexpensive to implement.

SUMMARY OF THE INVENTION

In light of the foregoing, it is a first aspect of the present invention to provide a hand-held game controller with cooling features.

It is another aspect of the present invention to provide a hand-held game controller with cooling features, comprising a housing, at least one hand grip extending from the housing, the at least one hand grip forming a hand grip cavity, and at least one of the housing or the at least one hand grip having a plurality of openings therethrough, a motor having a rotatable shaft, the motor carried in one of the housing and the at least one hand grip, the rotatable shaft extending into the hand grip cavity, and a fan connected to the rotatable shaft, wherein rotation of the fan by the rotatable shaft generates air flow into and out of the plurality of openings.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Referring now to the drawings, it can be seen that a hand-held game controller utilizes motors provided within the controller to operate fans which generate an air flow into and out of a plurality of openings provided within the hand grips and/or main body of the controller. Moreover, in some embodiments the fans are implemented to draw air in through the ends of the hand grips and direct a flow of air to areas where a player likely grips the controller. This air flow serves two primary purposes. First, the air flow helps to cool the motors and electronics which generate a significant amount of heat during use of the controller. Secondly, the air flow cools the controller hand grips which prevents a buildup of moisture, or sweat, on the player's hands. Different fan configurations are disclosed so as to accomplish the aforementioned purposes.

Figure 1:
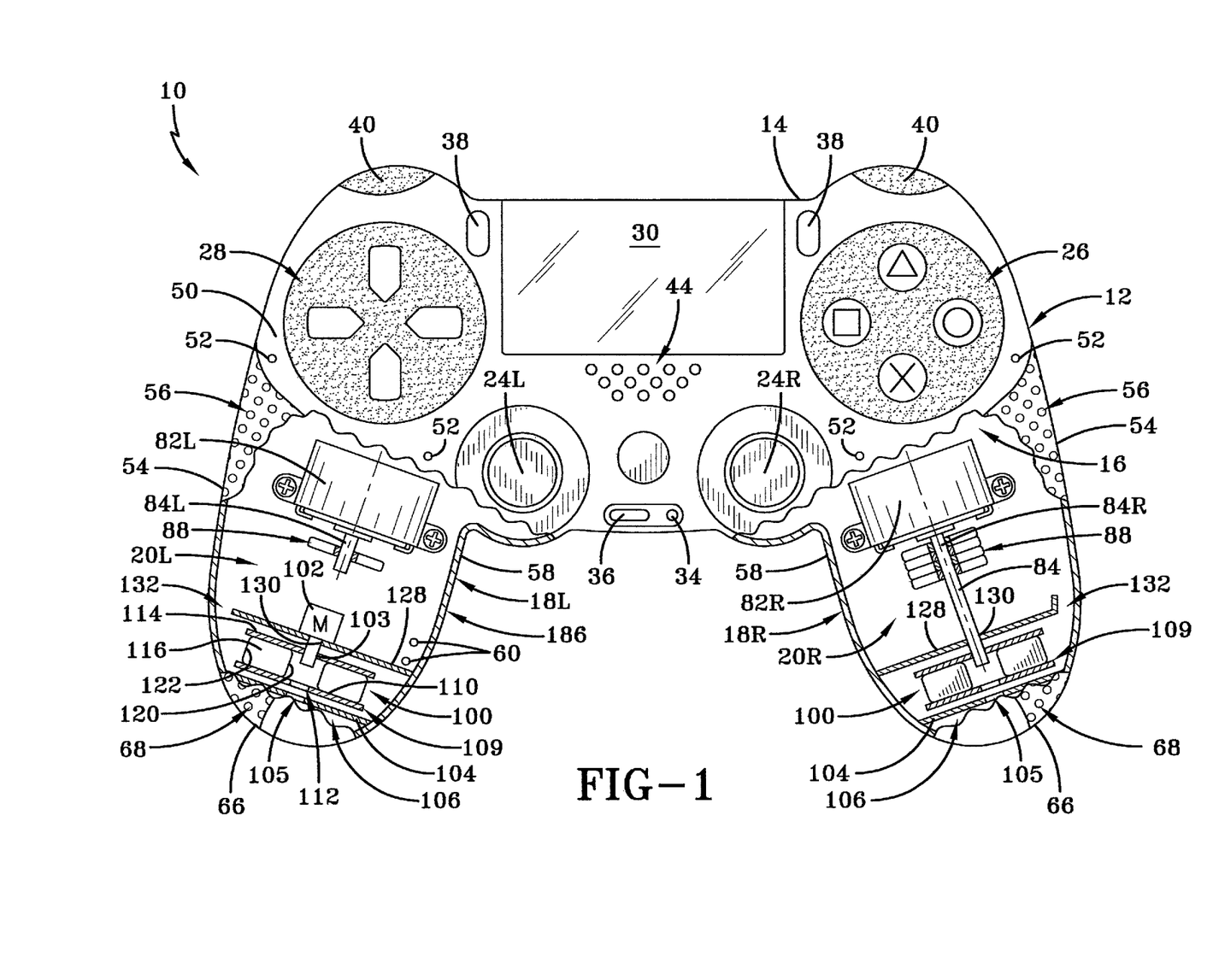
FIG. 1 is a front elevational view, partially broken away, showing a hand-held game controller according to the concepts of the present invention.
Figure 2:
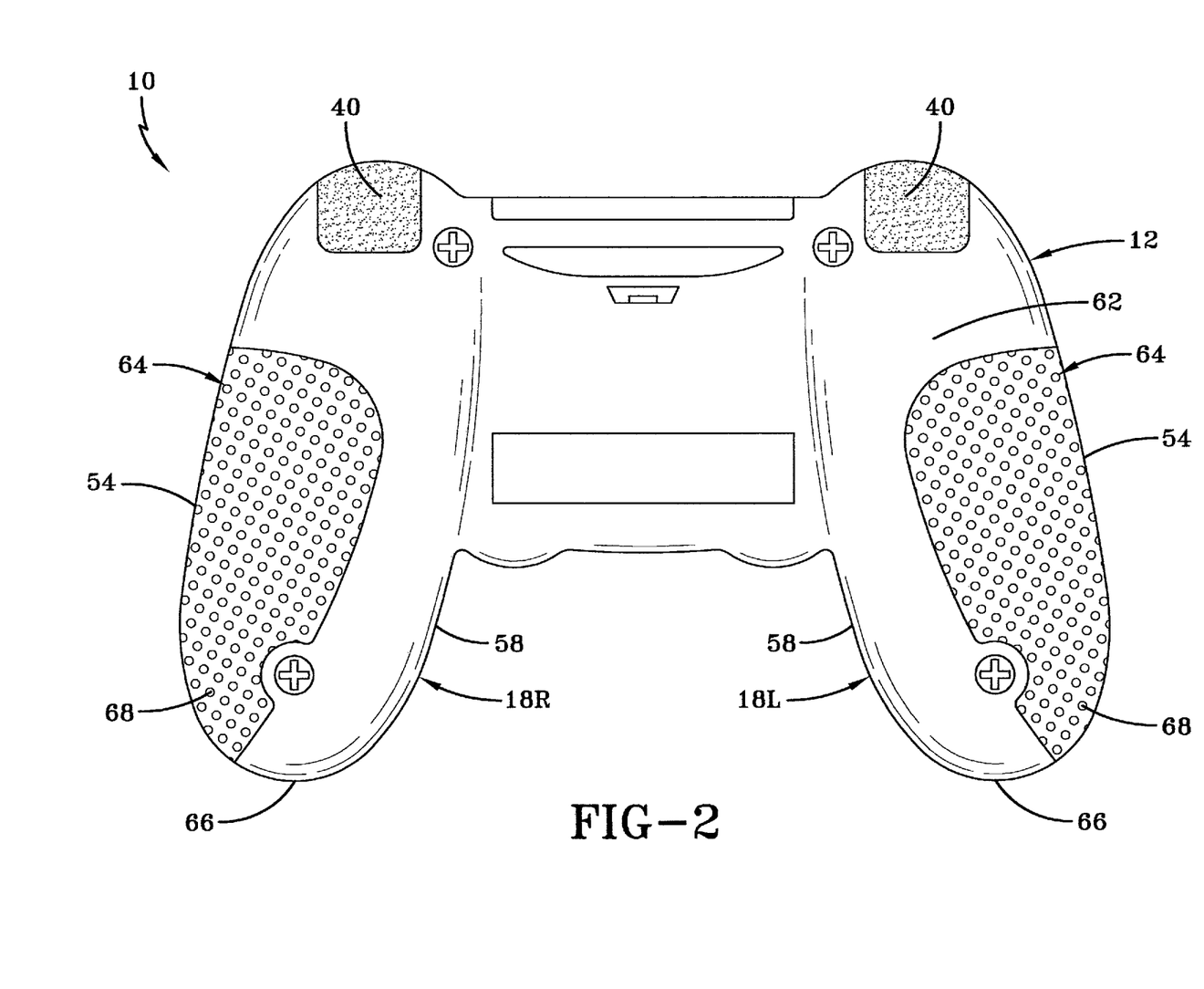
FIG. 2 is a rear elevational view of the hand-held game controller according to the concepts of the present invention.
Figure 3:
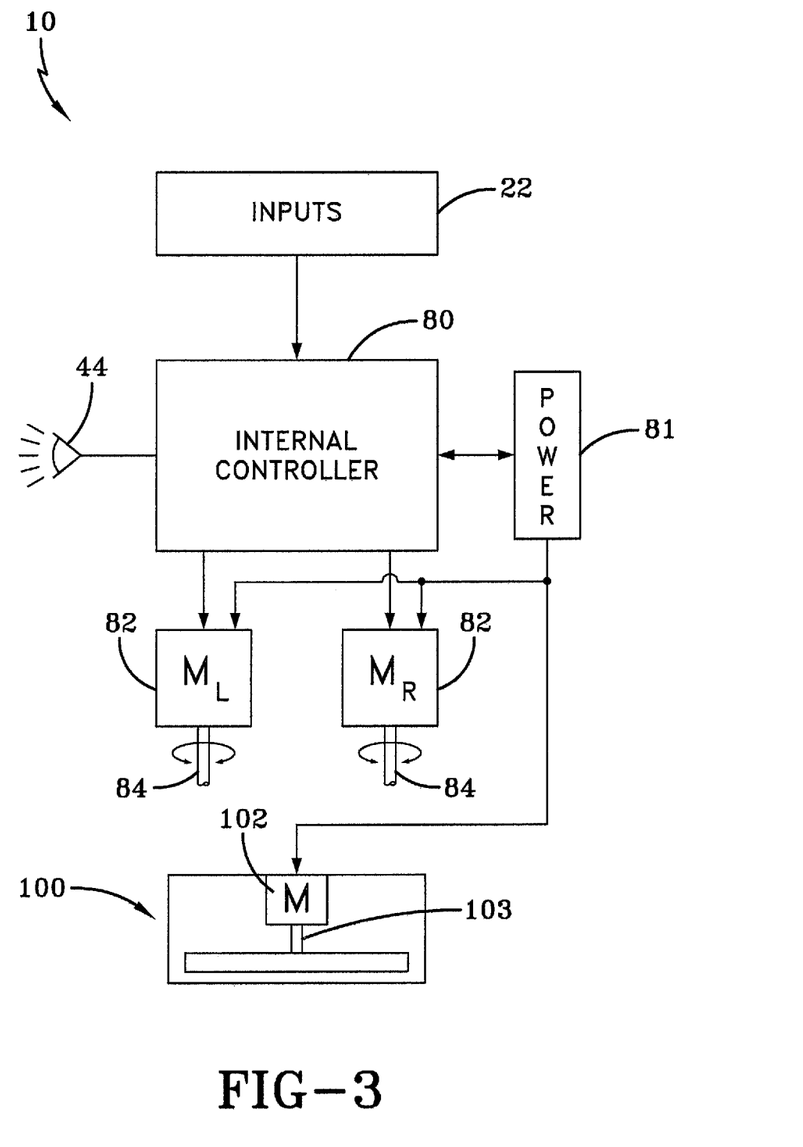
FIG. 3 is a schematic diagram of the hand-held game controller according to the concepts of the present invention.

Referring now to FIGS. 1-3, it can be seen that a hand-held game controller with cooling features is designated generally by the numeral 10. The controller 10 includes a housing 12 which may be made of a polymeric material and which is designed and shaped for ergonomic benefits. Although the housing 12 shown in the drawings is configured to be gripped by both hands of the person playing the video game or other type of game, skilled artisans will appreciate that the features described herein are adaptable for use with a game controller in which only a single hand is used such as a flight controller joystick, or an automobile gearshift. In any event, the housing 12 provides for a main body 14 wherein the body 14 has a body cavity 16 which houses or contains the controller's internal components. Extending downwardly and somewhat outwardly from the main body 14 may be a pair of hand grips 18 wherein the suffix R is used with the right hand grip and the suffix L is used with the left hand grip. The suffixes R and L may also be used with other components described herein. Each of the hand grips 18 form an internal grip cavity 20, wherein each grip cavity may be contiguous with the body cavity 16.

A number of user inputs 22 may be provided on the main body 14. These inputs include but are not limited to joysticks 24L and 24R, input buttons 26 provided on the right side of the body 14, and a plurality of input buttons 28 provided on the left side of the main body 14. A touchpad 30 may be provided in a centrally located position on the main body 14. The main body 14 may also provide for a headphone jack 34 and an external input port 36. Other function buttons 38 may be provided. In some controllers, the housing 12 may provide for one or more toggle levers 40 which are positioned at a top edge of the main body 14 or immediately underneath the top edge of the main body on a rear surface of the housing 12. A speaker port 44 may also be provided on the main body 14.

The main body 14 includes a front exterior surface 50 which faces the user and which may include the joysticks 24, the input buttons 26 and 28, and the other inputs 22. The front surface 50 may be provided with front surface openings 52 which are contiguous with the body cavity 16 and may be of any appropriate size or shape. Indeed, all of the openings disclosed herein that extend through the housing 12 into either the body cavity or the grip cavities may be sized and/or shaped so as to facilitate air flow through the controller while minimizing the flow of moisture into the controller. The main body also has other exterior or external surfaces which may share or are immediately adjacent those of the front surface 50. In particular, the hand grips 16 may provide for a lower palm exterior surface 54 wherein each lower palm exterior surface 54 provides a plurality of openings 56 which extend into the grip cavity 20 and/or the body cavity 16. The surface 54 is where the player most often positions the portion of their palm immediately below their thumb during use of the controller. The hand grips 18 may also provide for an inner finger exterior surface 58 wherein the surface 58 provides for openings 60 extending therethrough and which are also contiguous with the grip cavity 20 and/or the body cavity 16. The surface 58 is where the player often positions their fingers and finger tips during use of the controller.

As best seen in FIG. 2, the main body may include a back exterior surface 62 which covers the main body and the hand grips and which provides for back exterior surface openings 64 which are contiguous with the body cavity 16 and/or the grip cavities 20. The surface 62 is primarily where the player will position their palm and fingers while using the controller.

The hand grips 18 also provide for end external surfaces 66, which are at the distal end of the hand grips opposite the main body 14. The surfaces 66 may provide a transition between the exterior surfaces 50, 54, 58, and 62. The end external surface 66 may provide for end external surface openings 68 therethrough which are contiguous with the grip cavity 20. As will become apparent as the detailed description proceeds, air flow may fluidly proceed between from any one opening to any other opening depending upon configuration and/or operation of the fans as will be described.

As best seen in FIG. 3, the game controller 10 includes an internal controller 80 which sends and receives wired or wireless signals to and from a main controller (not shown) that runs the video game that is being viewed by the player. In other words, the internal controller receives and sends input signals via the inputs 22 to the main controller so as to interface with the video game. The internal controller 80 is powered by a power source or battery 81 wherein power from this power source or battery may be received from an external supply or may be contained in a rechargeable battery maintained within the housing 12. Connected to the internal controller and powered by the battery 81 may be a single motor 82 in the case of a joystick-type hand-held game controller, or as shown in the present drawings the motors which may be provided internally within the grip cavities 20. Each motor 82 includes a rotatable motor shaft 84 which may rotate in one direction or in some embodiments may rotate in either direction. In some embodiments, a shaker weight or weights 88 may be secured to the motor shaft 84 wherein rotation of the motor shaft rotates the shaker weights and generates a vibration within the housing 12 so as to provide for realistic experiences for the player. Skilled artisans will appreciate that in any of the embodiments described herein the shaker weights 88 may be eliminated so as to maximize the space utilized for the fans, as will be described.

In one embodiment, power is supplied to the motor 82 to rotate the shaft and the shaker weights, and also directly to a fan assembly, to be discussed below, that provides its own self-contained motor and which may operate independently of the motor 82. Indeed, skilled artisans will appreciate that any of the fan assemblies disclosed herein may be self-contained in that they operate independently of the motors used to energize the shaker weights.

A fan assembly, designated generally by the numeral 100, is received and maintained in the grip cavity 20L, As best seen in FIG. 1, the fan assembly 100 includes a motor 102 that receives electricity in a controlled manner from the power 81. The assembly 100 also includes an entry plate 104 which extends from internal surfaces of the hand grip 18L within the grip cavity 20L, wherein the entry plate 104 provides for an entry plate hole 105. The entry plate 104 and the internal surfaces of the hand grip, and in particular the internal surfaces of the hand grip proximal an end of the hand grip, form an entry cavity 106. The end of the hand grip provides the exterior surface openings 68 which are contiguous with the entry cavity 106.

The fan assembly 100 includes a fan, designated generally by the numeral 109. The fan 109 includes an entry disc 110 which is substantially planar in configuration and which has a disc eyelet 112 extending therethrough. The disc eyelet 112 is substantially aligned with the entry plate hole 105. The fan 109 also includes a shaft disc 114 which is secured to an end or at least a portion of a motor shaft 103 rotated by the motor 102. As such, in the present embodiment, the motor 102 and the fan 109 may be provided in a self-contained assembly substantially maintained within the hand grip cavity 20L, In any event, connected in between the entry disc 110 and the shaft disc 114 are a plurality of vanes 116 which may be straight or curvilinear in configuration. Each vane provides for an internal edge 120 which is substantially aligned with an edge of the disc eyelet 112 and an external edge 122 which may be aligned with the outer peripheries of the entry disc 110 and the shaft disc 114.

Positioned in a substantially parallel relationship with the entry plate 104 is an exit plate 128. The exit plate may be connected to the internal surfaces of the hand grip within the hand grip cavity 20. The exit plate 128 may also include an exit port 132 which is positioned between an interior surface sidewall of the hand grip and the exit plate. In particular, the exit port 132 is positioned, as best seen in FIG. 1, within the grip cavity 20L and adjacent the lower palm exterior surface 54 of the hand grip 18.

In an alternative embodiment, the fan assembly 100 may be configured without an internal motor, but instead operates from the motor 82 and its shaft 84 as shown in the hand grip 18R. In such an embodiment, the exit plate 128 provides for a shaft hole 130 extending therethrough so as to rotatably receive and allow for rotation of the motor shaft. Skilled artisans will appreciate that a bearing or some other type of seal, which allows rotation of the shaft, may be interposed between the exit plate 128, at the shaft hole 130, and the rotating shaft 84. All other structural features of the assembly shown in the hand grip 18L may be utilized in the hand grip 18R shown in FIG. 1.

In operation, rotation of the fan 109, by either the motor 102 or the motor 82, results in an airflow being generated between the openings 68 and the exit port 132, and further with any of the other openings extending through the surface of the hand grip and/or surfaces of the housing. It is believed that the best cooling flow will be generated by rotation of the fan so as to draw air in through the openings 68 and axially into the disc eyelet 112. Next, the air is radially expelled by the vanes 116 so as to exit the exit port 132. This air flow, upon exiting the port 132, then flows out any of the other openings maintained by the grip or housing so as to provide a cooling air flow. However, skilled artisans will appreciate that by reversing rotation of the motor shaft, that air flow may be reversible through the hand grips. In such a configuration, the position of the entry disc 110 and the shaft disc 114 would need to be switched, and in a similar manner the orientation or positioning of the exit port 132 and the entry plate hole 105 would need to be switched.

Figure 4:
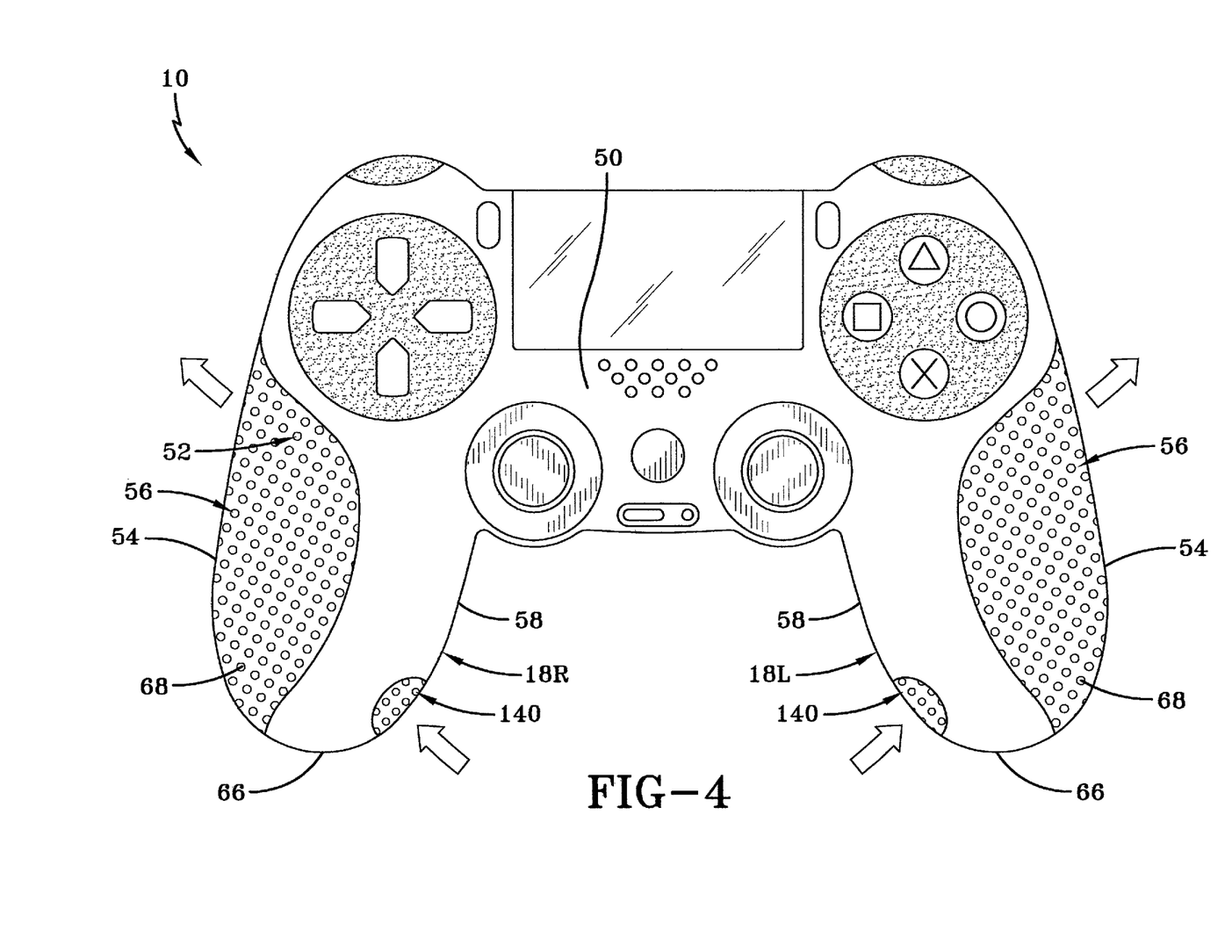
FIG. 4 is a front elevational view of an alternative hand-held game controller according to the concepts of the present invention.
Figure 5:
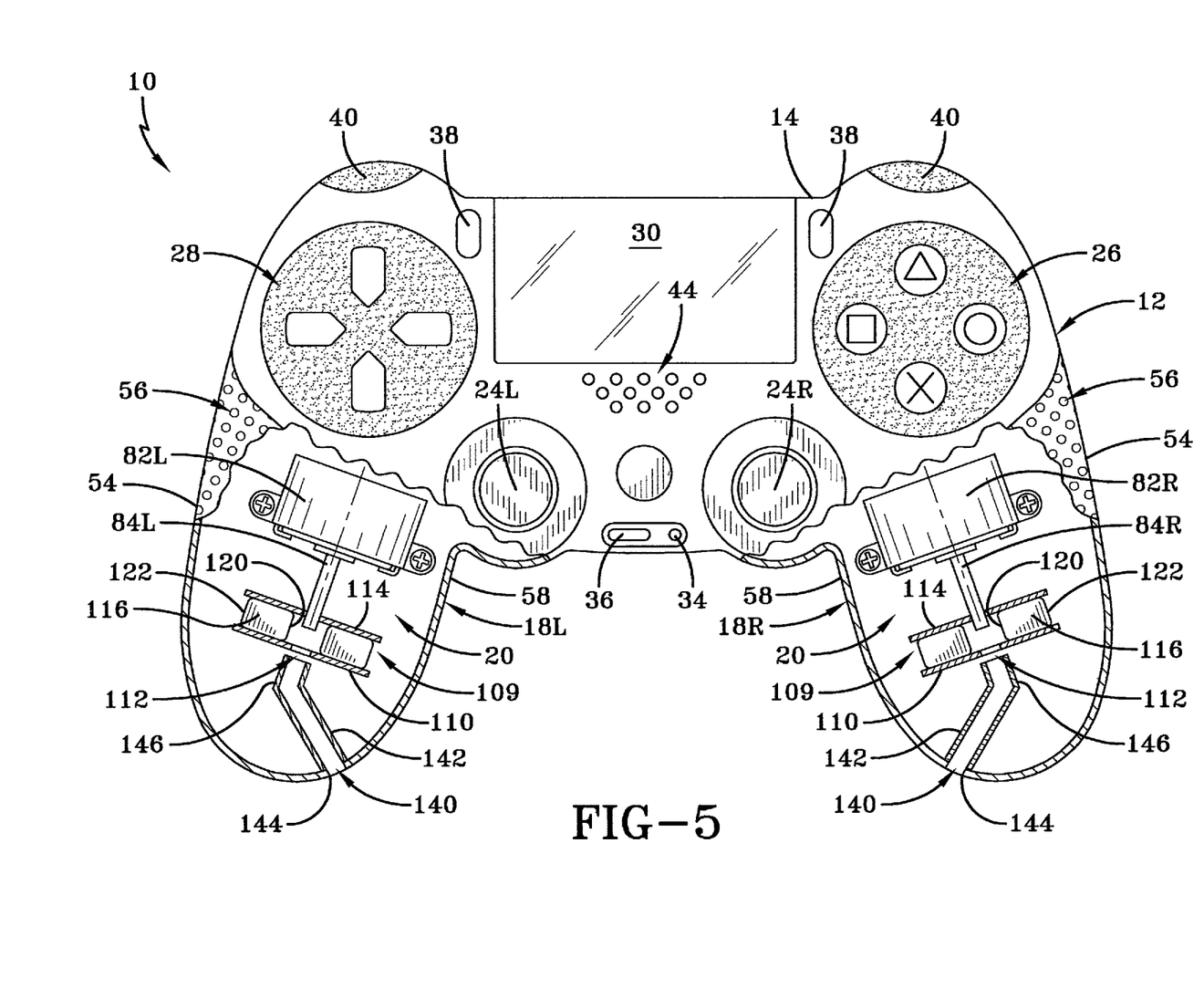
FIG. 5 is a front elevational view, partially broken away, of the alternative hand-held game controller according to the concepts of the present invention.

Referring now to FIGS. 4 and 5, it can be seen that an alternative fan configuration may be utilized in the controller 10. In this embodiment, the end surface 66 may provide for an end surface opening 140 which is positioned at a distal end of the hand grip and, in the present embodiment, is shown on an inner surface of the hand grip facing the opposed hand grip. The end surface opening is aligned with a conduit 142 which has an entry end 144 aligned with the end surface opening 140 and, in some embodiments, may be integrally contiguous therewith. The conduit 142 also provides for an exit end 146 which extends into the hand grip cavity 20. As shown in FIG. 5, the exit end 146 may be aligned with the disc eyelet 112 of the fan 109. In this embodiment the fan 109 may be either operated internally by the motor 102 or externally by the motor 82 as shown in FIGS. 1-3. As a result, the rotation of the fan 109 by the appropriate shaft results in air flow being generated through the end surface opening 140 directly into the disc eyelet 112. This axially directed air is then radially expelled by the vanes 116 whereupon the air is directed through the other openings provided by the main body 14.

Figure 6:
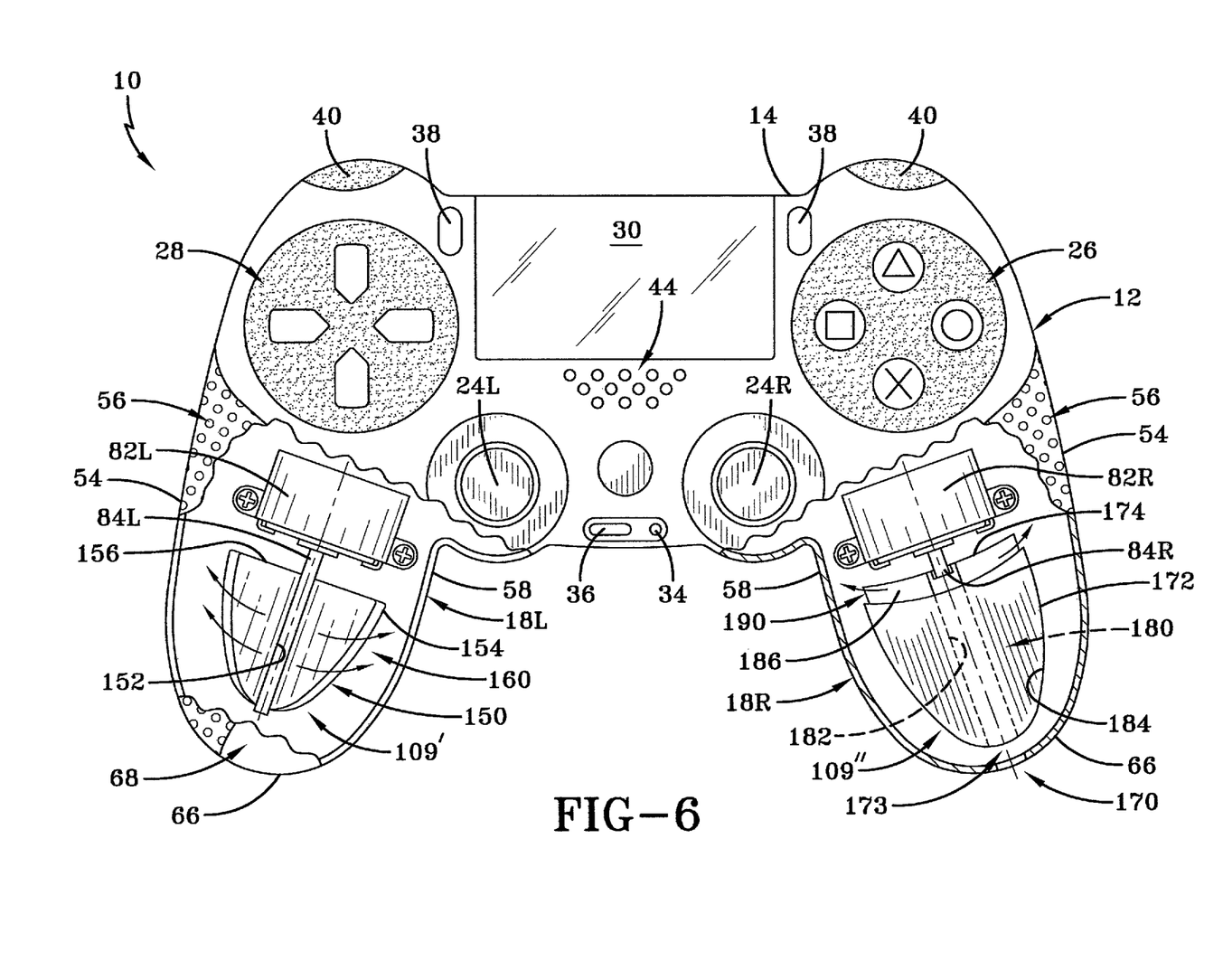
FIG. 6 is a front elevational view, partially broken away, of another alternative hand-held game controller, according to the concepts of the present invention.

Referring now to FIG. 6, alternative embodiments of the fan may be incorporated into the grip cavities 20. The hand grip 18L incorporates a fan designated generally by the numeral 109'. The fan 109' is directly associated with the shaft 84 and includes a plurality of vanes 150. Each vane 150 provides for a shaft edge 152 which is directly connected to the shaft and a contour edge 154 which substantially conforms with but without touching the internal surface of the hand grip that forms the grip cavity 20. The contour edge 154 and the internal surface of the hand grip 18 may form a gap 160 therebetween. Each vane also provides for an end edge 156 which extends from the shaft edge 152 to the contour edge 154 that is closest to the motor. Skilled artisans will appreciate that the vanes 150 may be planar or curvilinear in shape.

Rotation of the fan 109' will generate an air flow such that air may be directed throughout the main cavity and may draw air in from certain selected openings and expel the air through other selected openings. Internal louvers may be provided within the grip cavity or main cavity so as facilitate a desired air flow pattern through the interior of the main body 14 and the hand grips 18.

The hand grip 18R may incorporate a fan designated generally by the numeral 109". The hand grip 18R may have an entry opening 170 at the end surface 66. The fan 109" provides for a substantially frustoconical shaped entry disc 172 which substantially conforms with the internal surface of the hand grip. The entry disc 172 provides for a disc eyelet 173 which is substantially aligned with the entry opening 170. Connected to the rotating shaft 84 is a shaft disc 174 which may be planar or of a slight conical configuration oriented in the same orientation as the conical shape of the entry disc 172. Extending between each of the discs 172 and 174 are a plurality of vanes 180. Each vane 180 provides for an internal edge 182 which is substantially straight and which extends from the entry disc eyelet 173 to the shaft disc 174. Each vane 180 also provides for an external edge 184 which conforms and is in substantial contact with and may be connected to an interior surface of the entry disc 172. Each vane may include an end edge 186 which is in contact with and may be connected to the shaft disc 174. As seen in FIG. 6, the entry disc 172 extends to a position toward the shaft disc 174 but does not make contact therewith. As a result, the edge of the entry disc 172, the edge of the shaft disc 174, and the end edges 186 of the vanes 180 form a plurality of exit ports 190.

As a result, rotation of the fan 109" draws air in through the entry opening 170 and axially into the disc eyelet 173. The air is then directed downwardly along the surfaces of the vanes 180 and exits out the exit ports 190 into the grip cavity. From there, the air may exit any of the openings provided in the main body.

Based on the foregoing descriptions, the advantages of the present invention are readily apparent. The fans described may be independently operated or may be attachable to the motor shafts already provided in the commercially available game controllers, wherein those shafts are utilized to rotate shaker weights. In any of the embodiments described, the shaker weights may be removed or they may be associated with the fans as described herein. In any event, rotation of the fans within the hand grips generates an air flow which provides for cooling of the controller housing and also assists in keeping the player's hands cool and dry and helps to minimize the amount of sweat on their hands so that the controller can be firmly gripped and not result in the player's hands slipping on the controller, thereby ruining or disrupting their gaming experience.

Thus, it can be seen that the objects of the invention have been satisfied by the structure and its method for use presented above. While in accordance with the patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A hand-held game controller with cooling features, comprising:
   a housing;
   at least one hand grip extending from said housing, said at least one hand grip forming a hand grip cavity, and at least one of said housing or said at least one hand grip having a plurality of openings therethrough;
   a motor having a rotatable shaft, said motor carried in one of said housing and said at least one hand grip, said rotatable shaft extending into said hand grip cavity; and
   a fan connected to said rotatable shaft, wherein rotation of said fan by said rotatable shaft generates air flow into and out of said plurality of openings, wherein said at least one hand grip has an end surface with at least one end surface opening extending therethrough and contiguous with said hand grip cavity, and wherein rotation of said fan draws air into said hand grip cavity through said at least one end surface opening and expels the air through said plurality of openings.

2. The game controller according to claim 1, further comprising:
an entry plate carried in said hand grip cavity, said entry plate having an entry plate hole;
an exit plate carried in said hand grip cavity, said exit plate having an exit port, said fan positioned in between said entry plate and said exit plate, wherein rotation of said fan draws air into said entry plate hole and expels air out said exit plate hole.

3. The game controller according to claim 2, wherein said exit plate hole is positioned in said hand grip cavity in proximity to a lower palm external surface of said hand grip.

4. The game controller according to claim 1, wherein said fan comprises:
a plurality of vanes connected to said rotatable shaft, each said vane having a shaft edge connected to said rotatable shaft and a contour edge opposite said shaft edge, said at least one hand grip having a contour shape and said contour edge conforming substantially to said contour shape.

5. The game controller according to claim 1, wherein said motor and said fan are provided in a self-contained assembly maintained within said hand grip cavity.

6. A hand-held game controller with cooling features, comprising:
a housing;
at least one hand grip extending from said housing, said at least one hand grip forming a hand grip cavity, and at least one of said housing or said at least one hand grip having a plurality of openings therethrough;
a motor having a rotatable shaft, said motor carried in one of said housing and said at least one hand grip, said rotatable shaft extending into said hand grip cavity;
a fan connected to said rotatable shaft, wherein rotation of said fan by said rotatable shaft generates air flow into and out of said plurality of openings, wherein said at least one hand grip has an end surface with at least one end surface opening therethrough, and wherein said fan has an entry disc with a disc eyelet therethrough; and
a conduit extending between said at least one end surface opening and said disc eyelet, wherein rotation of said fan draws air through said conduit for delivery to said disc eyelet.

7. The game controller according to claim 6, wherein said at least one end surface opening is oriented near an inner finger external surface of said at least one hand grip.

8. The game controller according to claim 6, wherein said fan comprises:
a plurality of vanes connected to said rotatable shaft, each said vane having a shaft edge connected to said rotatable shaft and a contour edge opposite said shaft edge, said at least one hand grip having a contour shape and said contour edge conforming substantially to said contour shape.

9. The game controller according to claim 6, wherein said motor and said fan are provided in a self-contained assembly maintained within said hand grip cavity.

10. A hand-held game controller with cooling features, comprising:
a housing;
at least one hand grip extending from said housing, said at least one hand grip forming a hand grip cavity, and at least one of said housing or said at least one hand grip having a plurality of openings therethrough;
a motor having a rotatable shaft, said motor carried in one of said housing and said at least one hand grip, said rotatable shaft extending into said hand grip cavity; and
a fan connected to said rotatable shaft, wherein rotation of said fan by said rotatable shaft generates air flow into and out of said plurality of openings, wherein said at least one hand grip has an end surface with at least one end surface opening therethrough, and wherein said fan comprises:
a shaft disc connected to said rotatable shaft;
a plurality of vanes extending from said rotatable shaft, each said vane having an internal edge, an end edge connected to said shaft disc, and an external edge; and
an entry disc having a disc eyelet in close proximity to said at least one end surface opening, each said external edge connected to said entry disc; said entry disc, said shaft disc, and said external edges forming exit ports, wherein rotation of said fan draws air in through said at least one end opening and into said disc eyelet and expels the air through said exit ports and out said plurality of openings.

11. The game controller according to claim 10, wherein said at least one hand grip has a contour shape and wherein said entry disc substantially conforms to said contour shape.

12. The game controller according to claim 10, wherein said motor and said fan are provided in a self-contained assembly maintained within said hand grip cavity.

13. A hand-held game controller with cooling features, comprising:
a housing;
at least one hand grip extending from said housing, said at least one hand grip forming a hand grip cavity, and at least one of said housing or said at least one hand grip having a plurality of openings therethrough;
a motor having a rotatable shaft, said motor carried in one of said housing and said at least one hand grip, said rotatable shaft extending into said hand grip cavity;
a fan connected to said rotatable shaft, wherein rotation of said fan by said rotatable shaft generates air flow into and out of said plurality of openings; and
a shaker weight secured to said rotatable shaft.

14. The game controller according to claim 13, wherein said fan comprises:
a plurality of vanes connected to said rotatable shaft, each said vane having a shaft edge connected to said rotatable shaft and a contour edge opposite said shaft edge, said at least one hand grip having a contour shape and said contour edge conforming substantially to said contour shape.

15. The game controller according to claim 13, wherein said motor and said fan are provided in a self-contained assembly maintained within said hand grip cavity.

16. The game controller according to claim 13, further comprising:
an entry plate carried in said hand grip cavity, said entry plate having an entry plate hole;
an exit plate carried in said hand grip cavity, said exit plate having an exit port, said fan positioned in between said entry plate and said exit plate, wherein rotation of said fan draws air into said entry plate hole and expels air out said exit plate hole.

17. The game controller according to claim 16, wherein said exit plate hole is positioned in said hand grip cavity in proximity to a lower palm external surface of said hand grip.

* * * * *